United States Patent [19]

Marrie

[11] 3,809,325

[45] May 7, 1974

[54] FOOD-COMMINUTION DEVICE

[75] Inventor: Paul Marrie, Dijon, France

[73] Assignee: S.A.R.L. Etud, Zone Industrielle, Quetigny, France

[22] Filed: May 10, 1972

[21] Appl. No.: 251,970

[30] Foreign Application Priority Data

Dec. 30, 1971 France .............................. 71.47501

[52] U.S. Cl. ............ 241/278 R, 241/282.1, 259/108
[51] Int. Cl. ............................................ B02c 18/12
[58] Field of Search ..... 241/280, 277, 282.1, 282.2, 241/199.12, 46.17, 278 R; 259/108, DIG. 25, DIG. 26

[56] References Cited
UNITED STATES PATENTS

| 913,187 | 2/1909 | Arnstein | 241/280 X |
|---|---|---|---|
| 3,032,087 | 5/1962 | Rodwick | 241/280 X |
| 3,053,297 | 9/1962 | Brundler | 241/282.2 X |
| 3,137,333 | 6/1964 | Nishina | 241/282.1 X |
| 3,156,278 | 11/1964 | Otto | 241/282.2 |
| 3,528,469 | 9/1970 | Mantelet | 241/199.12 |
| 3,612,126 | 10/1971 | Emmons et al. | 241/199.12 |

FOREIGN PATENTS OR APPLICATIONS

| 206,376 | 12/1956 | Australia | 241/199.12 |
|---|---|---|---|
| 1,088,678 | 9/1960 | Germany | 259/108 |

Primary Examiner—Granville Y. Custer, Jr.
Assistant Examiner—Howard N. Goldberg
Attorney, Agent, or Firm—Karl F. Ross; Herbert Dubno

[57] ABSTRACT

A food chopper has a power base from which a drive shaft extends upwardly. A receptacle provided with a lateral outlet opening is mounted on this base and forms an upwardly open cylindrical chamber around the shaft. A replaceable cutting unit fits within this chamber and has levels, e.g. for cutting the foodstuffs and ejecting the cut product centrifugally or for two cutting stages. A cover formed with a vertical feed well fits over this unit and closes a safety switch which permits the motor in the base to operate.

8 Claims, 11 Drawing Figures

FOOD-COMMINUTION DEVICE

FIELD OF THE INVENTION

The present invention relates to a food-comminution device and, more particularly, to an apparatus for chopping, shredding, sectioning, and similarly cutting up such foodstuffs as meat, vegetables, and the like.

BACKGROUND OF THE INVENTION

One known type of food chopper (food grinder) has a small upwardly open hopper which opens at its lower end into a horizontally cylindrical chamber in which an auger is provided. This auger which may be rotated by a motor or by hand by means of a crank forces chunks of food up to a perforated die or plate against one face of which a blade is rotated. This blade is rotationally coupled to the auger so that it cuts up the food as it is extruded through the perforated plate.

Such an apparatus has a relatively limited capacity since the energy required to turn the auger is considerable. In addition it is difficult to control the particle size at the output, and cleaning the device is a difficult and time-consuming operation, especially since the die and blade at least are usually made of rust-prone steel. For these reasons such food grinders have found limited acceptance with the home trade, and even for such use the disadvantages often outweigh the advantages.

It is also known to comminute foodstuffs in apparatus operating in accordance with the principles of a blender, simply by placing pieces of the food in a chamber in which high-speed rotating blades are provided. This method is indeed simple, yet it is extremely difficult to control the degree of food subdivision which is a function of time. Once again this method lends itself only to certain applications. When, for instance, carrots must be sliced, such an apparatus cannot be used. Also the blades must be removed with the vessel, which determines the size of the charge to be processed, and continuous output is precluded.

Further devices are known to allow tthe slicing or grating of food by means of large rotatable disks formed with sharp-edged slots or holes and against which the foodstuff is urged. A crank is attached to the grater or slicer disk to allow the user himself to control the cutting rate. These devices have limited utility for continuous feed comminution and are generally incapable of juicing the comestible or performing other desirable operations.

OBJECTS OF THE INVENTION

It is therefore an object of the present invention to provide an improved comminution device of high versatility, especially for foodstuffs which may be required in various stages of subdivision.

Another object is the provision of a food-chopping apparatus which is of robust but simple construction, which is of low cost but high adaptability to various food-comminution tasks, which can be readily cleaned and has little tendency toward breakdown and which can be used with equal facility for tasks as varied as the slicing of carrots, the grinding of meat and the production of juices, pastes and the like in a continuous manner.

SUMMARY OF THE INVENTION

These objects are attained according to the present invention in a food-comminution device, hereinafter referred to generally as a chopper, having a base containing a drive motor and transmission whose output shaft projects axially up from the base. A collar provided with a radially open outlet spout is carried on the top of the base while a sleeve, in accordance with one embodiment of the invention, fits within this collar and is itself provided with a partition wall subdividing the cylindrical chamber defined within the sleeve into an upper region and a lower region. The partition is formed with a throughgoing orifice radially offset from the drive shaft which carries a cutting element above the partition and an impeller element below the partition. A cover is mounted on the sleeve and is formed with an inlet well which opens parallel to the shaft axis and radially offset therefrom into the upper region. Thus as food is pushed into the upper region the cutter sections it and moves it around to the orifice which is angularly offset from the inlet. The sectioned food falls through this orifice into the lower region or compartment whence it is projected radially out of the chopper through the outlet by the impeller.

According to another feature of this invention the central unit comprising the sleeve formed with the partition and the two rotating bodies can be replaced by units for slicing carrots, preparing coleslaw or the like, grating cheese, crushing ice, and many other tasks. For example, the unit may have an upper member constituting the cutting element for sectioning the foodstuff, shredding or grating it, while the lower member may simply be an impeller disk. If two comminution stages are required the second or lower member may also be a cutting blade or grater. Either or both elements may shear the food against a stationary portion of the device or operate only against the inertia of a foodstuff as in a blender.

In accordance with yet another feature of this invention the cover is rotatable relative to the sleeve so that the extent of chopping in the upper region or compartment may be varied, since the fineness of the chopping in this compartment is dependent on how far the food must travel angularly from the inlet to the orifice.

In accordance with another feature of the invention, the cutting-chamber-forming collar is removably mounted on the top of the upwardly converging frustoconical base, e.g. by a bayonet coupling, to permit replacement units to be mounted on the latter when comminution and lateral dispensing of the comminuted product is not desired or to enable cleaning of this portion of the structure. The collar, which has an axial (vertical) dimension which is small by comparison with that of the vertically elongated cover (of generally cylindrical configuration) and the vertically elongated base, also removably supports the cover, a suitable bayonet coupling being provided therebetween. The cover, which may have a slightly upward frustoconical taper, can be formed with a pair of flats enabling it to be gripped firmly by the user for mounting and dismounting. It also is generally cup-shaped, being downwardly open to register with the upwardly open collar, and is integrally formed with a cylindrical partition defining the well. The top of the cover also preferably slopes downwardly toward the well which, as has been noted, is offset with respect to the axis.

The upper portion of the power shaft, which projects vertically upwardly above the floor of the collar and, therefore, above the top of the base, is provided with means keying the shaft to a cutting unit for axial withdrawal and replacement of the latter in accordance with comminution requirements, the cutting unit being angularly entrained by the shaft when in place. I prefer, moreover, to provide the cutting unit with two functionally distinct elements, e.g. for preliminary cutting, shredding, grating close to the top of the collar and proximal to the bottom of the well, or for final cutting, impeller-like dispensing, etc. close to the floor of the collar.

When the cutting unit is changed, moreover, automatically operable switch means may be actuated to change the speed of the unit to one appropriate to the newly assigned task while other switch means may be provided to prevent operation of the motor when any of the parts described above has been dismounted.

DESCRIPTION OF THE DRAWING

The above and other objects, features, and advantages will become apparent from the following description reference being made to the accompanying drawing in which.

SPECIFIC DESCRIPTION

Figure 1:
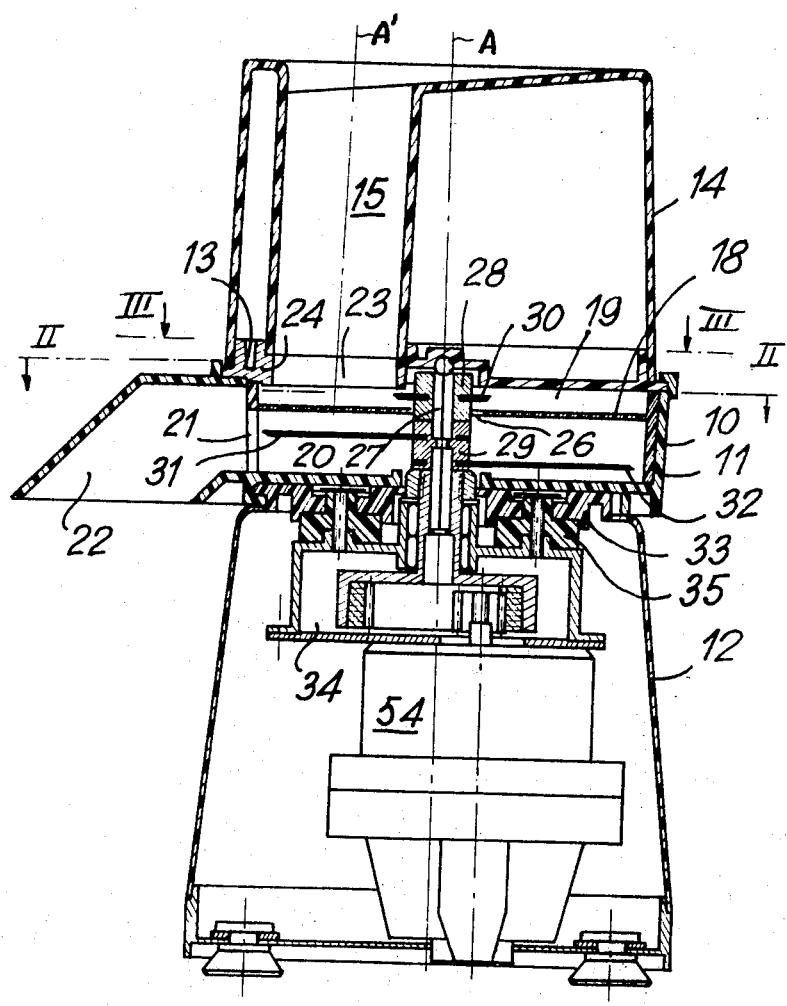
FIG. 1 is a vertical section through the apparatus according to the present invention.
Figure 2:
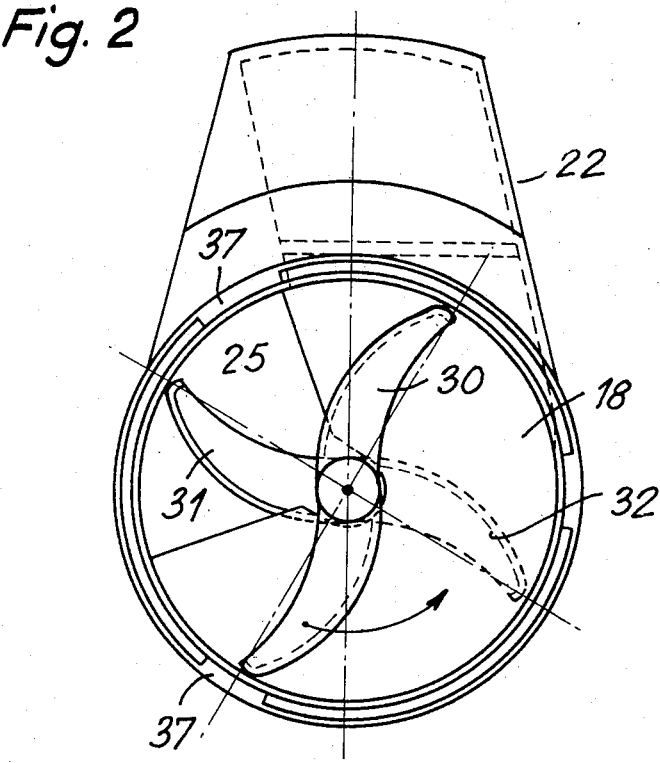
FIG. 2 and 3 are sections taken along lines II — II and III — III respectively of FIG. 1.

As seen in FIGS. 1 - 4 the chopper according to the present invention comprises a frustoconical base 12 on which is removably mounted a synthetic-resin receptacle 10 in which is received the chopping chamber 11. A synthetic-resin disk 13 is removably connected to the top of the receptacle 10 and serves to hold the chamber 11 in place and in turn is surmounted by a cover 14, all made of synthetic-resin material.

This cover 14 is formed with a vertical well 15 which has an axis A' offset from the central vertical axis A of the device. A two-part telescoping plunger 16, 17 (FIGS. 4 and 5) fits within this well 15.

The chamber 11 is formed with a horizontal partition 18 to form an upper prechopping compartment 19 and a lower final-chopping or ejection compartment 20. An outlet opening 21 is formed in the wall of the chamber 11 opening radially and tangentially to this chamber and provided with a downwardly directed outlet spout 22.

The disk 13 is formed with a rim 24 defining an oval opening 23, and the partition 18 is formed with a throughgoing orifice 25 having the shape of a 90° sector. The opening 23 and the orifice 25 are angularly offset from each other by a distance which may be varied by rotating the cover 14 relative to the chamber 11, this latter chamber being fixed by means of a tongue in the receptacle 10 so that it does not rotate and so that the hole 21 and spout 22 register at all times.

Figure 9:
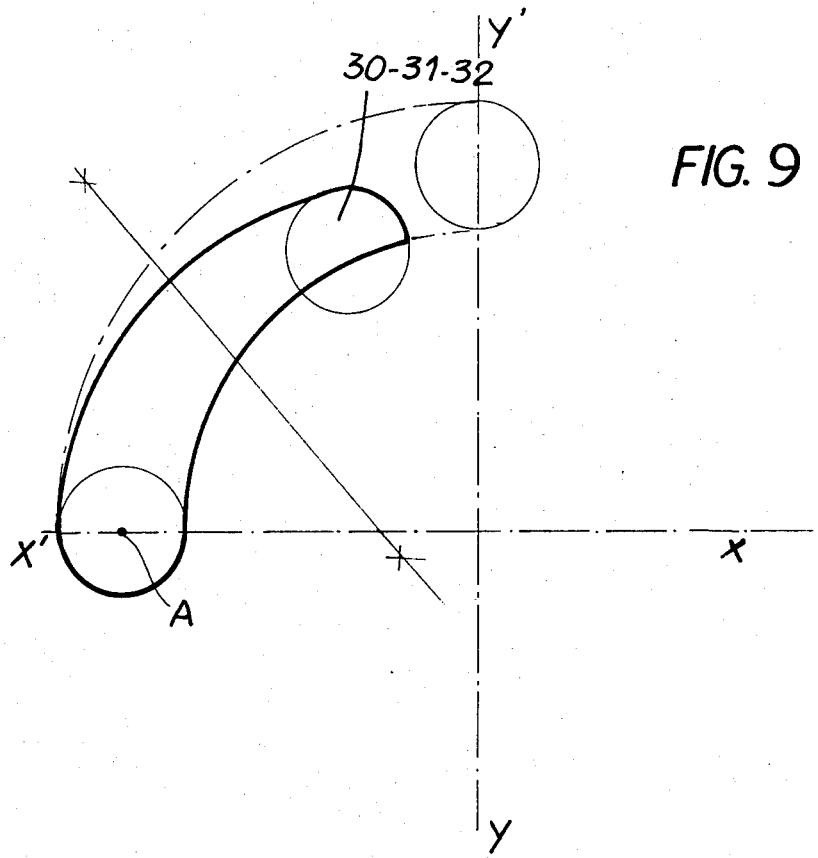
FIG. 9 is a view in profile of one of the cutting blades.

The partition 18 is formed at its center with a hole 26 through which passes a drive shaft 27 carrying an upper hub 28 mounting a pair of coplanary cutting element 30 and a lower hub 29 carrying two cutting elements 31 and 32. The upper elements 30 sweep just below the mouth of the well 15. One of the lower blades 31 sweeps just below the partition 18 and the other blade 32 sweeps just above the base of the receptacle 10. As shown in FIG. 9 each blade is crescent-shaped with a convex leading cutting edge and a concave trailing edge. In addition each blade is tapered toward its end and is therefore formed with a circularly arcuate trailing edge and a spiral leading edge. The blades 31 and 32 are set at 180° to each other and at 90° to the blades 30.

The base 12 receives a motor 54 which is connected through a transmission 34 to the hexagonal-section shaft 27. This transmission 34 is secured to the support plate 33 of the base 12 by means of rubber shock mounts 35. It should be clear that the base 12 with its drive 34, 54 can also be used to power other devices such as a fruit juicer, coffee mill, mixer, or the like.

FIGS. 2 - 5 show in particular detail how the receptacle 10 is formed with three equispaced inwardly directed tongues 37 engageable in matching radially opening notches 36 formed in the upper rim 38 of the receptacle. Thus when secured together, in bayonet-fashion, the cover 13, 14 rests on the upper edge of the chamber 11. One of the tongues 37 and one of the notches 36 may be wider than the others so as to ensure a correct angular positioning of the cover 14 relative to the base 12.

Figure 3:
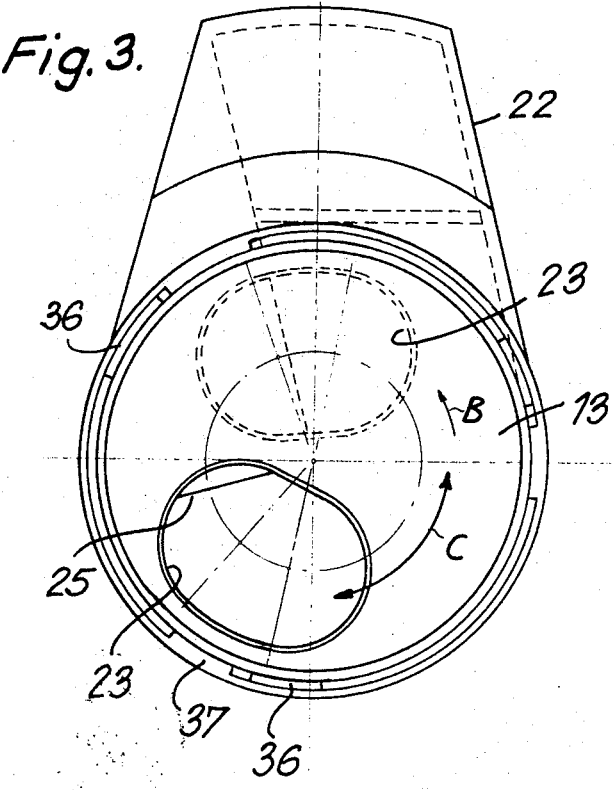
Figure 4:
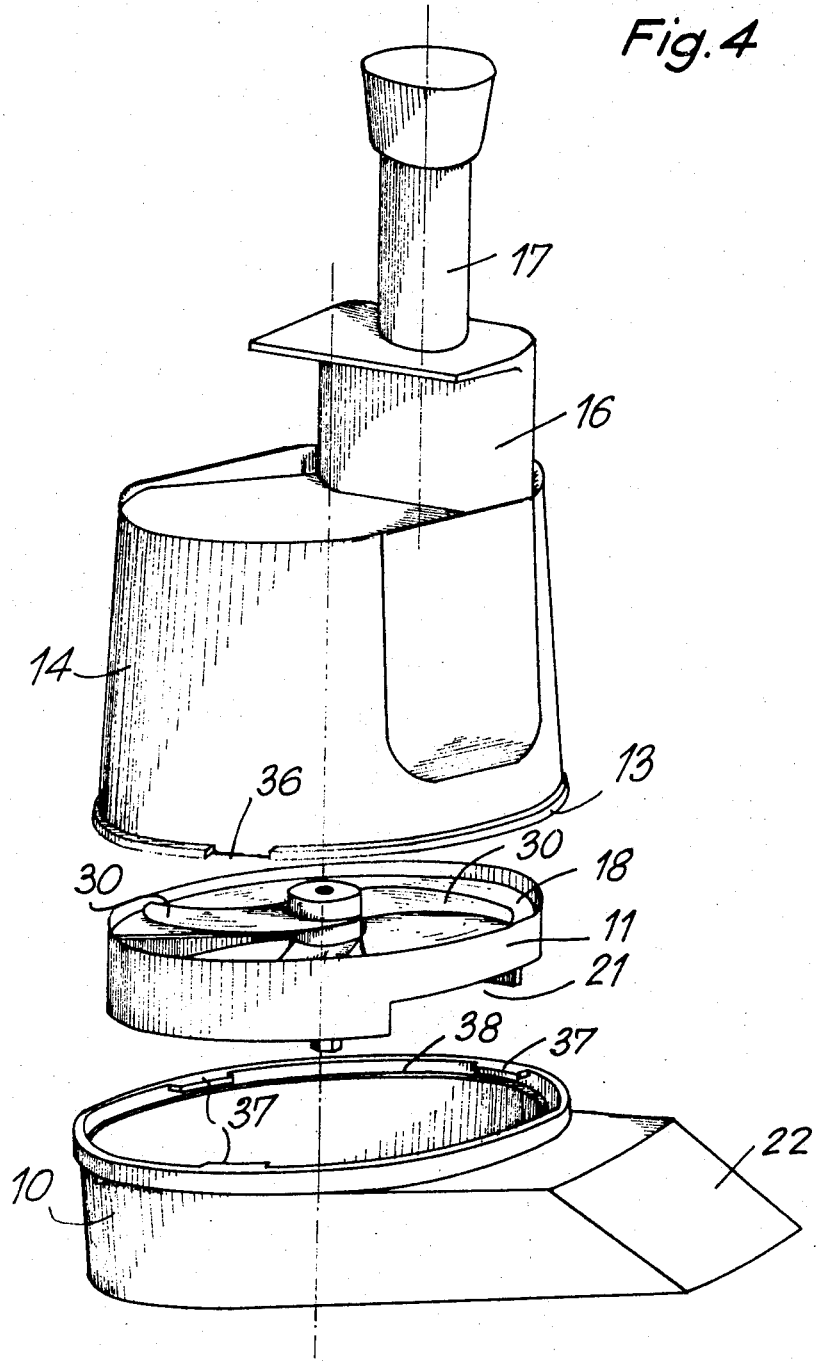
FIGS. 4 and 5 are perspective exploded views of the device according to the present invention showing two different cutting units.

Thus the mode of operation of the device of FIGS. 1 – 4 is that chunks of food are inserted into the well 15 and forced downwardly therein by the plunger 16, 17. The upper blades 30 section the food and displace it around the compartment 19 until it falls through the orifice 25 into the compartment 20 where the blades 31 and 32 further comminute the sectioned pieces of food. These blades 31 and 32 also act as impellers to eject the chopped food out through the opening 21. If finer chopping is desired the angular spacing between the holes 23 and 25 is set at a maximum. In FIG. 3 dot-dash lines show one end position of the hole 23 and solid lines show the other. Since arrow B shows the rotation direction of blades 30–32 and the double-headed arrow C illustrates how the hole 23 is displaceable in around 270° between the two illustrated end positions it should be clear that in the dot-dash position the sectioned foodstuff will have a minimally long path to travel before passing through the hole 25, whereas in the solid-line position this path will be maximized. The length of the path is proportional to the fineness with which the food will be chopped so that the user need merely rotate the cover 14 to determine the fineness. Fineness indicia on the cover 14 and on the housing 12 can be provided.

During this operation the motor 54 is operated at 6000 revolutions per minute (rmp) by means of a double-pole double-throw switch 50 which is controlled by the chopping unit 11. This switch 50 is connected to the field windings 54' of the motor 54 and is operated by a rod 41 which is vertically displaceable in a bore 42 formed in the receptacle 10. A spring 43 urges the rod 41 upwardly in this bore and the lower end of the rod carries an actuating member 44 in the form of a leaf spring which connects with the switch 50. When the chopping unit 11, 18 is set in the receptacle 10 this rod is depressed and the motor 54 is switched over to run at 6,000 rpm rather than at its normal speed of 3,000 rpm.

Figure 5:
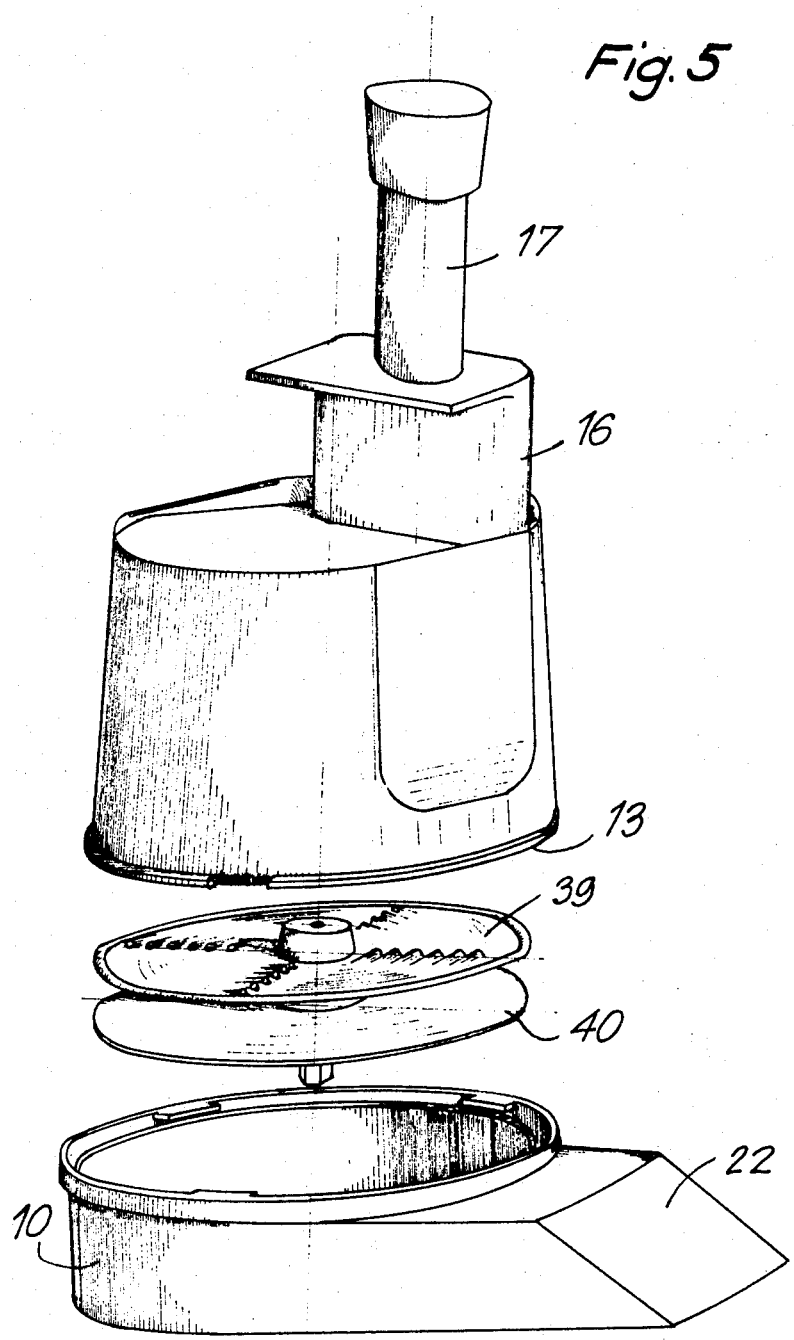
Figure 6:
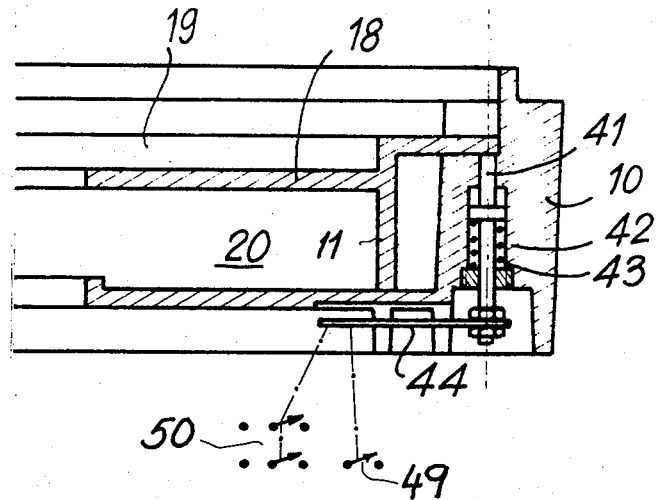
FIGS. 6 and 7 are enlarged sectional views of details of the chopper of FIG. 1.
Figure 11:
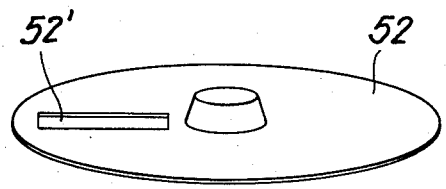
FIG. 11 is a top view of another type of cutter according to the present invention.

In another mode of operation the chopping chamber 11 is not employed, but a pair of stainless-steel disks 39 and 40 as shown in FIG. 5 are set in the receptacle 10. The upper disk 39 is formed as a slicer or grater with only four sharp-edged perforated regions, and the lower disk 40 is solid and acts exclusively as an impeller to shoot the slided or grated food out the spout 22. Since no chamber 11 is provided the rod 41 will not be depressed and the advantageously slower motor speed of 3,000 rpm will be used for these more delicate operations. FIG. 5 also shows how the central cylindrical member 17 of the plunger is unscrewed from this outer plunger 16 so that, say, a carrot may be dropped into the hole it leaves such that neat crosswise slices of the carrot may be taken. During such an operation the outer plunger member 16 remains fully inserted and depressed. The disk 39 of FIG. 5 may be replaced by the disk 52 of FIG. 11 which has a single sharp-edged radial slot 52' that serves to cut neat slices of whatever foodstuff is placed in the well 15. Such a cutter is useful in slicing potatoes for making potato chips, or for slicing eggs, beets, or the like.

Figure 7:
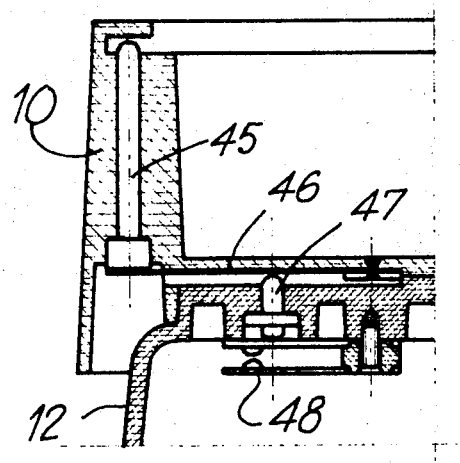
Figure 8:
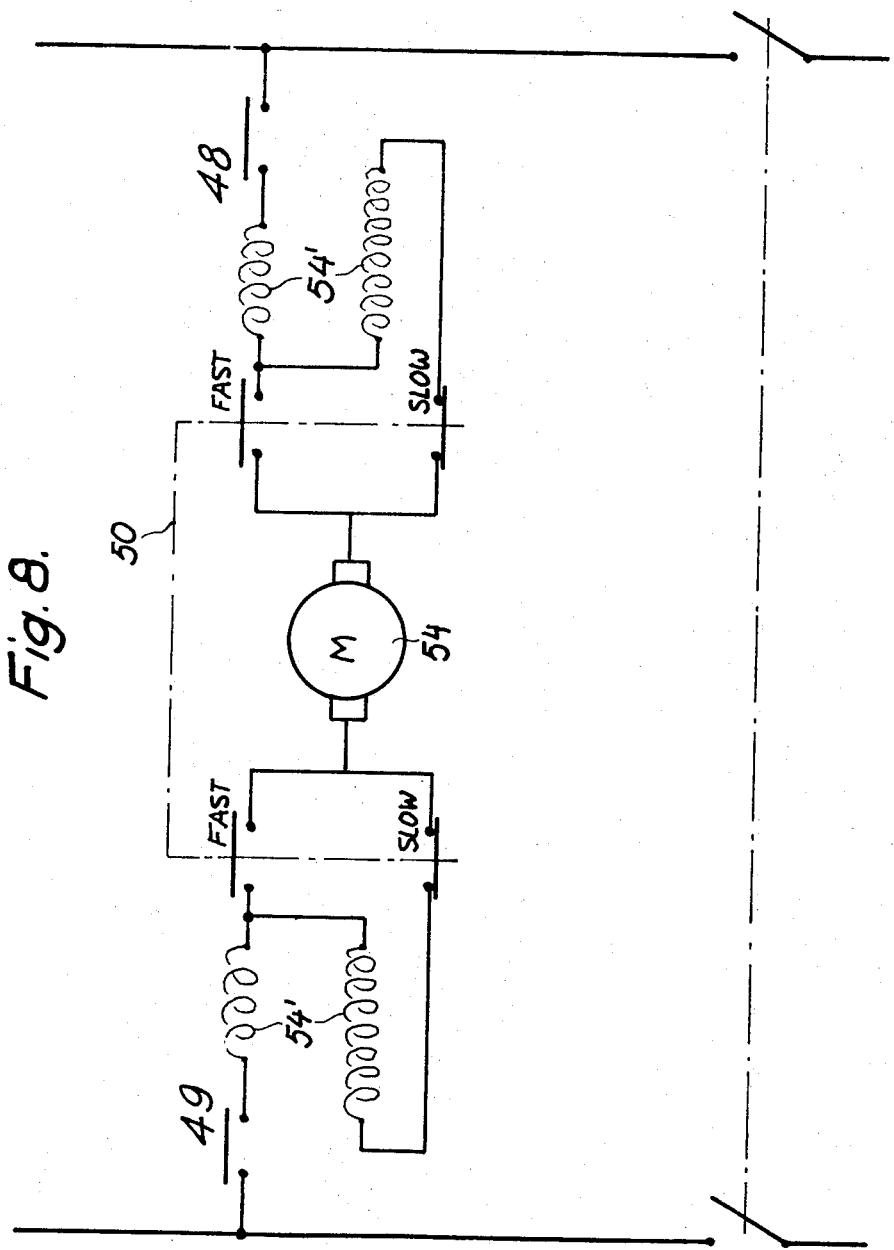
FIG. 8 is a schematic diagram of the wiring of the device of FIG. 1.

In all of the mentioned embodiments the receptacle 10 is removable, as is of course the cover 14. Since the projecting hexagonal shaft 27 of the motor 54 is potentially hazardous a switch structure as shown in FIG. 7 is employed to prevent operation of this motor whenever either the cover or the receptacle is not in place. To this end the receptacle 10 is provided with a pin 45 carried on a spring which in turn engages through another pin 47 in the housing 12 with a switch 48 in series with the motor (see FIG. 8). Thus as long as the receptacle is not in place the pin 47 will not be depressed and the motor 54 cannot run. Similarly, since the end of pin 45 projects into the seat for the cover 14, so long as this cover is not in place and depressing the pin 45 the pin 47 will not be depressed by the spring 46 and the motor cannot operate. A similar switch 49 connected to the speed selection spring can be provided at the seat for the chopping chamber 11.

Figure 10:
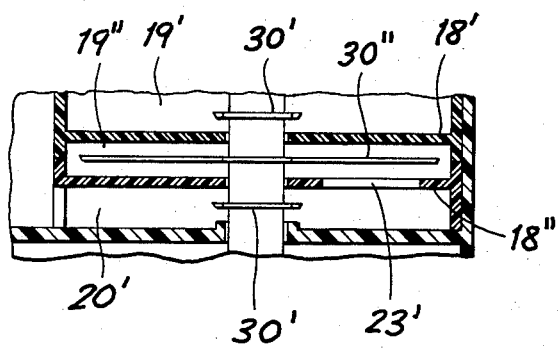
FIG. 10 is a sectional view of an alternative embodiment of the present invention.

Finally, FIG. 10 shows how three chambers 19', 19'', and 20' may be provided separated by partitions 18' and 18'' formed with angularly offset orifices. Separate sets of blades 30', 30'', and 31' may be provided in each chamber in order to attain a very fine comminution. Similarly four or more chambers could be so stacked.

The device according to the present invention is of very simple construction and extremely easy to use. With the exception of its base and the cutting elements, it can be made almost entirely of the thermosetting synthetic resin so that it may be easily washed. The user can with no difficulty control just how finely the device will chop, and the necessary speeds will be chosen automatically for him by mounting of the proper attachment.

I claim:
1. A food chopper comprising:
   a base;
   a drive shaft extending axially upwardly from said base;
   means mounted on said base spacedly surrounding said shaft and defining a generally cylindrical upwardly open chamber therearound and forming a generally laterally opening outlet for said chamber;
   a rotatable cutting element carried on said shaft at an upper region of said chamber;
   a rotatable impeller element carried on said shaft at a lower region of said chamber;
   means forming an inlet opening downwardly into said upper region generally parallel to said shaft and laterally offset therefrom;
   drive means in said base for rotating said shaft and said elements, whereby a foodstuff inserted into said upper region through said inlet is sectioned by said cutting element and is thereafter ejected from said lower region through said outlet by said impeller element; and
   a tubular body removably receivable in said chamber and formed with a partition spanning said chamber below said cutting element and above said impeller element, said partition being provided with a single orifice constituting the sole communication between said regions past said partition and laterally offset from both said inlet and said shaft.

2. The chopper defined in claim 1 wherein said drive means includes a motor selectively operable at a relatively slow rate and at a relatively fast rate and switch means connected to said motor and engageable by said body for switching said motor from said slow rate to said fast rate on mounting of said body in said chamber.

3. The chopper defined in claim 1 wherein said impeller element is a cutting blade.

4. The chopper defined in claim 1 wherein said cutting element is angularly offset to said impeller element by substantially 90°.

5. The chopper defined in claim 1 wherein said impeller element includes a first blade rotatable in the upper part of said lower region and a second blade rotatable in the lower part of said lower region.

6. The chopper defined in claim 1 wherein said means forming said inlet is a removable cover formed with a well having a lower end constituting said inlet.

7. The chopper defined in claim 6 wherein said drive means includes electric motor and switch means connected in series with said motor and engageable by said cover for closing a circuit and only allowing operation of said motor with said removable cover in place.

8. The chopper defined in claim 1 wherein said elements are disks, said cutting element being formed with at least one sharp-edged perforation.

* * * * *